US008601572B2

(12) United States Patent
King et al.

(10) Patent No.: US 8,601,572 B2
(45) Date of Patent: Dec. 3, 2013

(54) METHOD FOR SHARING A MEDIA COLLECTION IN A NETWORK ENVIRONMENT

(75) Inventors: Ryan Eric King, San Diego, CA (US); David E. Brown, San Francisco, CA (US); Robert Porter, San Carlos, CA (US); Adam Korman, Glendale, CA (US); Manish Upendran, San Jose, CA (US); Kathleen Wilson, San Diego, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1296 days.

(21) Appl. No.: 11/315,989

(22) Filed: Dec. 21, 2005

(65) Prior Publication Data

US 2006/0195902 A1 Aug. 31, 2006

Related U.S. Application Data

(60) Provisional application No. 60/657,222, filed on Feb. 28, 2005, provisional application No. 60/678,718, filed on May 5, 2005.

(51) Int. Cl.
*H04L 29/00* (2006.01)

(52) U.S. Cl.
USPC ............................................ 726/21; 709/219

(58) Field of Classification Search
USPC ............. 84/609; 707/104.1; 709/219; 726/21
See application file for complete search history.

(56) References Cited

U.S. PATENT DOCUMENTS

| | | | |
|---|---|---|---|
| 5,950,173 A * | 9/1999 | Perkowski | 705/26 |
| 6,226,672 B1 * | 5/2001 | DeMartin et al. | 709/219 |
| 6,248,946 B1 | 6/2001 | Dwek | |
| 6,389,467 B1 | 5/2002 | Eyal | |
| 6,466,918 B1 | 10/2002 | Spiegel et al. | |
| 6,477,704 B1 | 11/2002 | Cremia | |
| 6,728,729 B1 * | 4/2004 | Jawa et al. | 707/104.1 |
| 2001/0018858 A1 * | 9/2001 | Dwek | 84/609 |
| 2002/0002498 A1 | 1/2002 | Hatakeyama | |
| 2002/0152267 A1 | 10/2002 | Lennon | |
| 2003/0031176 A1 | 2/2003 | Sim | |
| 2003/0046399 A1 | 3/2003 | Boulter et al. | |
| 2003/0088571 A1 | 5/2003 | Ekkel | |

(Continued)

FOREIGN PATENT DOCUMENTS

WO WO 02/33579 4/2002

OTHER PUBLICATIONS

Stauffer. "How to do everything with iTunes for Macintosh and Windows." published Feb. 27, 2004. 11 pages.*

(Continued)

*Primary Examiner* — Jeffrey Pwu
*Assistant Examiner* — Michael D Anderson
(74) *Attorney, Agent, or Firm* — Berkeley Law & Technology Group, LLP

(57) ABSTRACT

In one aspect, the present disclosure provides for the accessing and playing of media files having differing associated rights such as non-DRM media files, purchased and downloaded media files, subscription download files such as tethered downloads, and subscription streamed DRM files. In one embodiment, the present disclosure provides a method and user interface for sharing a media collection among computing devices in communication via a network. In one embodiment, the disclosed method allows access and playback, from each computing device on a network, of all media files in a media collection, regardless of their associated rights.

42 Claims, 12 Drawing Sheets

(56) References Cited

U.S. PATENT DOCUMENTS

| | | | |
|---|---|---|---|
| 2003/0182254 | A1 | 9/2003 | Plastina et al. |
| 2003/0236832 | A1 | 12/2003 | McIntyre et al. |
| 2004/0019497 | A1 | 1/2004 | Volk et al. |
| 2004/0064476 | A1 | 4/2004 | Rounds |
| 2004/0088348 | A1 | 5/2004 | Yeager et al. |
| 2004/0177116 | A1 | 9/2004 | McConn |
| 2005/0021470 | A1 | 1/2005 | Martin et al. |
| 2005/0021750 | A1 | 1/2005 | Abrams et al. |
| 2005/0038814 | A1 | 2/2005 | Iyengar et al. |
| 2005/0038877 | A1 | 2/2005 | Gupta et al. |
| 2005/0097006 | A1* | 5/2005 | Nyako ........................... 705/26 |
| 2005/0108320 | A1 | 5/2005 | Lord et al. |
| 2005/0210396 | A1 | 9/2005 | Galli |
| 2006/0122946 | A1* | 6/2006 | Fahrny et al. ................... 705/71 |
| 2006/0173825 | A1* | 8/2006 | Hess et al. ........................ 707/3 |
| 2008/0215882 | A1* | 9/2008 | Coldicott et al. ............ 713/166 |

OTHER PUBLICATIONS

Mac Observer. "iTunes 4 Tip—Sharing iTunes libraries over IP; It's not just for Rendezvous." published Apr. 29, 2003 to MacObserver.com. 2 pages.*

Notification of Transmittal of the International Search Report and the Written Opinion of the International Searching Authority, or the Declaration (PCT/US06/06685).

Notification Concerning Transmittal of International Preliminary Report on Patentability dated Oct. 4, 2007 PCT/US06/006440.

Notification Concerning Transmittal of International Preliminary Report on Patentability dated Sep. 20, 2007 PCT/US06/006934.

Notification of Transmittal of the International Search Report and the Written Opinion of the International Searching Authority, or the declaration dated Oct. 19, 2007 PCT/US06/06683.

International Search Report (PCT/US06/06440).

Notification Concerning Transmittal of International Preliminary Report on Patentability (PCT/US2006/006687).

Notification of Transmittal of the International Search Report and the Written Opinion of the International Searching Authority, or the Declaration (PCT/US06/07124).

Brown, Janelle; "MP3 free-for-all"; [Online] XP002219000; Retrieved from the Internet http://groups.google.com/groups?selm=Pine.GSU.4.10.10002050020300.16171-100000%40adore.lightlink.com&output=gplain; retrieved on Oct. 30, 2002; 6 pages.

Epema D. H. J. ,et al."Music2Share-Copyright-Compliant Music Sharing in P2P Systems" Proceedings of the IEEE, col. 92, No. 6; Jun. 1, 2004; pp. 961-970.

Supplementary Search Report EP 06 73 6092.5 dated Aug. 20, 2009; 3 pages.

Guterman, Jimmy: "Will AOL Tame Aimster?-file sharing system piggyback's on AOL instant messaging-Company Business and Marketing"; [Online] XP002532806; Dec. 18, 2000; Retrieved from the Internet http://findarticles.com/p/articles/mi_mOHWW/is_51_3/ai_68156286/ retrieved on Jun. 18, 2009; 3 pages.

Yang B. et al; "Comparing Hybrid peer-to-peer systems" Proceedings of the 27th VLDB Conference, Roma, Italy; Sep. 11, 2001; pp. 561-570.

Supplementary Search Report EP 06 73 6090.9 dated Jun. 18, 2009; 3 pages.

International Preliminary Report on Patentability (PCT/US2006/006932); Mar. 17, 2009; 7 pages.

* cited by examiner

| Requesting Computing Device | Sharing Computing Device | Level of Authorization, Dependent on Media File Format ||||
| --- | --- | --- | --- | --- | --- |
| | | Streaming | Tethered Download | Downloaded / Purchased | Non-DRM |
| No subscription to online media service. 1205 | Subscription to online media service. 1210 | The requesting device can only play a portion of the media file or may be denied all access. 1215 | The requesting device can only play a portion of the media file. Or, the requesting device can request the sharing device to sin into the online service under the sharing device's subscription id. Then, the requesting device has full access via the sharing device. 1220 | The requesting device has full access provided the sharing device had access. Or, the requesting device can request the sharing device to sign into the online service under the sharing device's subscription id. Then, the requesting device has full access. 1225 | The requesting device has full access. 1230 |
| Subscription to an online media service. 1235 | Subscription to online media service. 1240 | The requesting device has full access to the media files. 1245 | The requesting device has full access to the media files. 1250 | The requesting device has full access to the media files. 1255 | The requesting device has full access to the media files. 1260 |

FIG. 12

METHOD FOR SHARING A MEDIA COLLECTION IN A NETWORK ENVIRONMENT

CROSS-REFERENCE TO RELATED APPLICATION

This application claims the benefit of and is continuation in part of U.S. Provisional Application Ser. No. 60/657,222, filed Feb. 28, 2005, entitled A SYSTEM AND METHOD FOR DELIVERING MEDIA OVER A NETWORK, and U.S. Provisional Application Ser. No. 60/678,718, filed May 5, 2005, entitled A SYSTEM AND METHOD FOR DELIVERING MEDIA OVER A NETWORK, both of which are hereby incorporated herein by reference.

BACKGROUND

The expansion of the Internet and the World Wide Web ("web") has given computer users the enhanced ability to listen to and to watch various different forms of media from various sources through their computers. This media can be in the form of audio music, music videos, and television programs, sporting events or any other form of audio or video media that a user wishes to watch or listen to. As time evolved, users were able to take the music that was on that compact disc store it on their computers and listen to it locally. Further, online media sources developed which allowed users to acquire thousands of media files. Typically, these online media sources employ digital rights management (DRM) to restrict the usage of media files purchased and downloaded online. Additionally, systems were developed which allowed users in a network environment to share their media collection with other networked computing devices. However, the current systems are not capable of supporting the access and playback of a comprehensive set of media files with several types of associated DRM such as streaming media files, tethered downloads, and/or purchased downloads. Thus, what is lacking in each of the currently available systems is a system in which all types of media files, regardless of their associated DRM or rights are available for viewing and playback on a computing device, in one aspect, in a network environment.

SUMMARY OF THE INVENTION

The present disclosure addresses the above identified deficiencies in the current art. In one aspect, the present disclosure provides for the accessing and playing of media files having differing associated rights such as non-DRM media files, purchased and downloaded media files, subscription download files such as tethered downloads, and subscription streamed DRM files. In one embodiment, the present disclosure provides a method and user interface for sharing a media collection among computing devices in communication via a network. In one embodiment, the disclosed method allows access and playback, from each computing device on a network, of all media files in a media collection, regardless of their associated rights.

In one embodiment, the present disclosure provides for a method of sharing a media collection among computing devices in communication via a network, the method comprising requesting, from a first computing device operated by a first subscriber, access to a media collection associated with a second subscriber on a second computing device, the first and second computing device being capable of communication via the network, the first subscriber associated with a first level of authorization to interact with an online media service and the second subscriber associated with a second level of authorization to interact with the online media service; receiving, at the first computing device, a set of media file identifiers from the second computing device, each identifier associated with a respective media file of the media collection; displaying at least a portion of the set of identifiers; and making the respective media files available for being experienced on the first computing device according to a set of rules and the first level and the second level of authorization, the respective media files capable of being acquired from a source either by streaming the respective media file from the source or downloading the respective media file as a tethered download from the source.

In one embodiment, the set of rules comprises analyzing a user's level of authorization to interact with the online media service.

In one embodiment, the respective media files are available for being experienced on the first computing device if the first level of authorization matches the predetermined level of authorization. In another embodiment, the respective media files are prevented from being experienced on the first computing device if the first level of authorization does not match the predetermined level of authorization. In another embodiment, the first level and the second of authorization are a same level. In another embodiment, the respective media files are available for being experienced on the first computing device if the first level of authorization matches the second level of authorization. In another embodiment, the respective media files are prevented from being experienced on the first computing device if the first level of authorization does not match the second level of authorization. In another embodiment, either one or both of the first level of authorization and the second level of authorization is associated with full access to all media files of the online media service. In another embodiment, either one or both of the first level of authorization and the second level of authorization is associated with full access to all tethered media file downloads of the online media service. In another embodiment, either one or both of the first level of authorization and the second level of authorization is associated with full access to all streaming media files of the online media service. In another embodiment, either one or both of the first level of authorization and the second level of authorization is associated with preventing access to all media files of the online media service. In another embodiment, either one or both of the first level of authorization and the second level of authorization is associated with allowing access to a portion of media files of the online media service. In another embodiment, wherein the first level of authorization and the second level of authorization are similar or dissimilar.

In one embodiment, the set of rules permit the media files to be played by the first computing device if the first level of authorization and the second level of authorization are both associated with a subscription to the online media service. In another embodiment, the set of rules prevent the media files from being streamed to the first computing device if the second level of authorization is associated with a subscription to the online media service and the first level of authorization is not associated with the subscription. In another embodiment, the set of rules prevent the media files from being downloaded to the first computing device if the second level of authorization is associated with a subscription to the online media service and the first level of authorization is not associated with the subscription.

In one embodiment, the network is the internet, is a local area network. In another embodiment, the network is constrained by the number of computing devices connected to the network.

In one embodiment, the media file identifier comprises a pointer to the respective media file, a uniform resource locator and/or a universal resource identifier.

In one embodiment, the source comprises a server, the second computing device, and/or a plurality of sources. In another embodiment, the sources may be different. In another embodiment, the source comprises a first source if the respective media file is acquired by streaming the respective media file and the source comprises a second source if the respective media file is downloaded as a tethered download.

In one embodiment, either one or both of the first computing device and the second computing device is a personal computer.

In one embodiment, the media collection comprises at least one media file, which may be an audio file, video file, and/or playlist.

In one embodiment, the method of sharing a media collection among computing devices in communication via a network further comprises receiving, from the second subscriber, a setting associated with sharing the media collection. In one embodiment, the setting comprises user-entered text representing a name of the second computing device as it appears to the first computing device, permitting the second computing device to stream media files to the first computing device, and/or permitting the first computing device to only browse media files associated with the second computing device.

In one embodiment, the method of sharing a media collection among computing devices in communication via a network further comprises receiving, from the second subscriber, a preference associated with sharing the media collection. In one embodiment, the preference comprises permitting the entire media collection to be shared with the first computing device, permitting only a portion of media collection to be shared with the first computing device, permitting all playlists associated with the second subscriber to be shared with the first computing device, permitting only playlists designated as public by the second subscriber to be shared with the first computing device, permitting only user-selected playlists associated with the second subscriber to be shared with the first computing device, and/or preventing all playlists associated with the second subscriber to be shared with the first computing device.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

FIG. 12 is an exemplary set of rules according to one exemplary embodiment.

DETAILED DESCRIPTION

In one embodiment, the present disclosure provides a method, and user interface for sharing a media collection among computing devices in communication via a network. In one embodiment, the disclosed method allows access and playback, from each computing device on a network, of all media files in a media collection, regardless of their associated rights. In one embodiment, the media files available within a network are from an online media service and thus are streamed or downloaded as a tethered download. In a further embodiment, the present disclosure provides a method, and user interface for sharing a media collection among a computing device and a network enabled device in communication via a network.

As used herein, the term network can encompass any type or size of network such as the internet or a home, corporate, or local area networking environment whether local or wireless. Further, in one embodiment, the term computing device refers to any device capable of recognizing a unique token. In one embodiment, a unique token may be associated with a user or member id unique to an online media service or online community. In one embodiment, the computing device can comprise devices such as a local computer, a cellular phone, a portable media device, a personal digital assistant, or any device with the processing power and the ability to recognize a unique token. In one embodiment, a network enabled device comprises those devices not capable of recognizing a unique token.

Additionally, as used herein, a tethered download is a file that contains a time-based DRM that expires after a certain amount of time. For example, if a user is part of a subscription service and has the rights to access a certain media file for a certain length of time, a tethered download of that media file is loaded onto the user's processor and the user will be able to play that file for a certain length of time (e.g., 30 days). At the end of the predetermined length of time, the file becomes unusable and can no longer be played by the user.

In addition, as used herein, the terms content or media or media files are used broadly to encompass any type or category of experienceable, retrievable, filed and/or stored media, either singly or collectively, and individual items of media or content are generally referred to as entries, songs, tracks, items or files, however, the use of any one term is not to be considered limiting as the concepts features and functions described herein are generally intended to apply to any storable and/or retrievable item that may be experienced by a user, whether audibly, visually or otherwise, in any manner now known or to become known. For example, audio, video, personal packaged audio and or video content such as podcasting, music videos, RSS feeds, still images or photos, and/or variations and combinations thereof.

Figure 2:
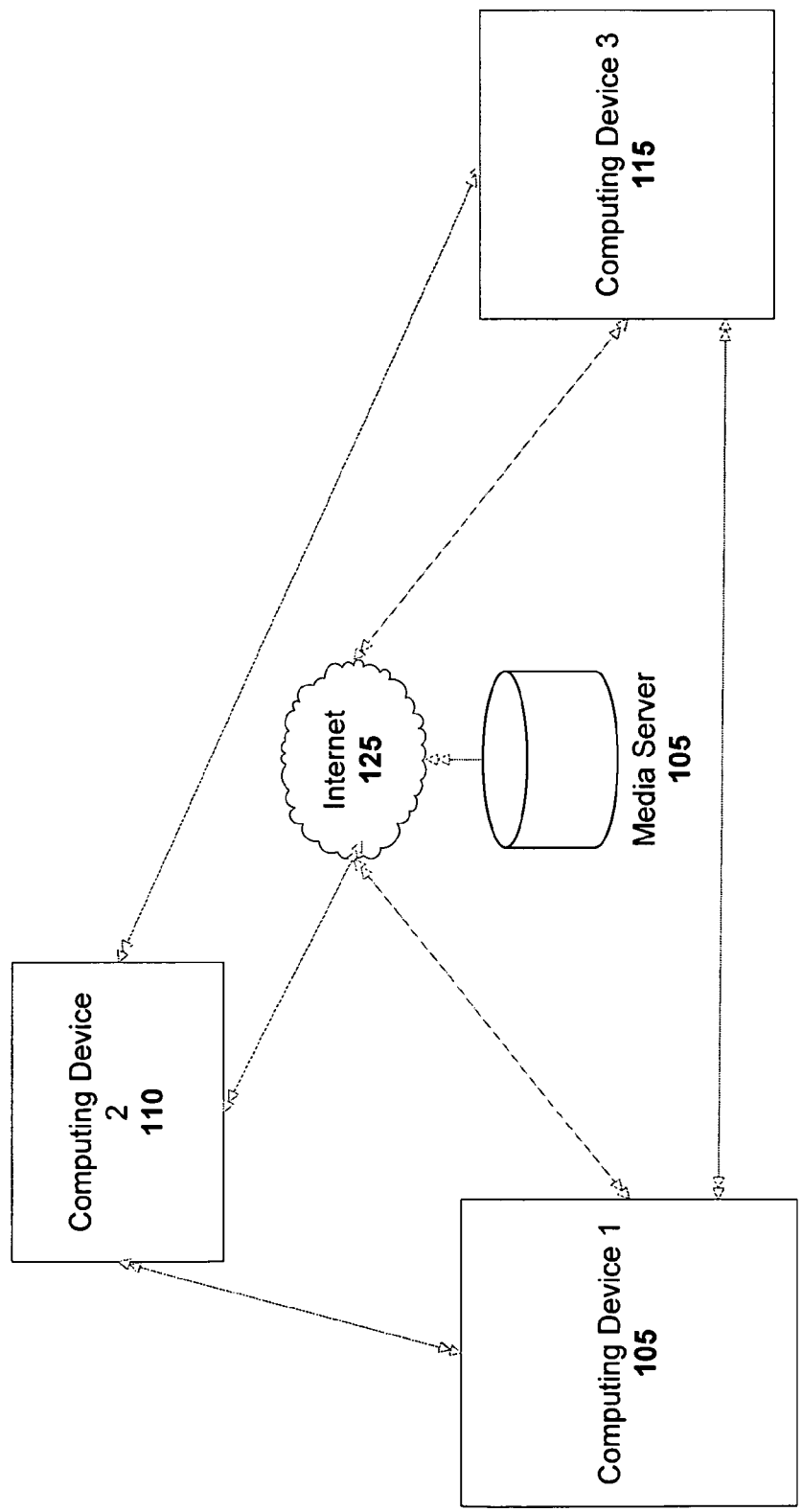
FIG. 2 is an exemplary system architecture of one embodiment.
Figure 3:
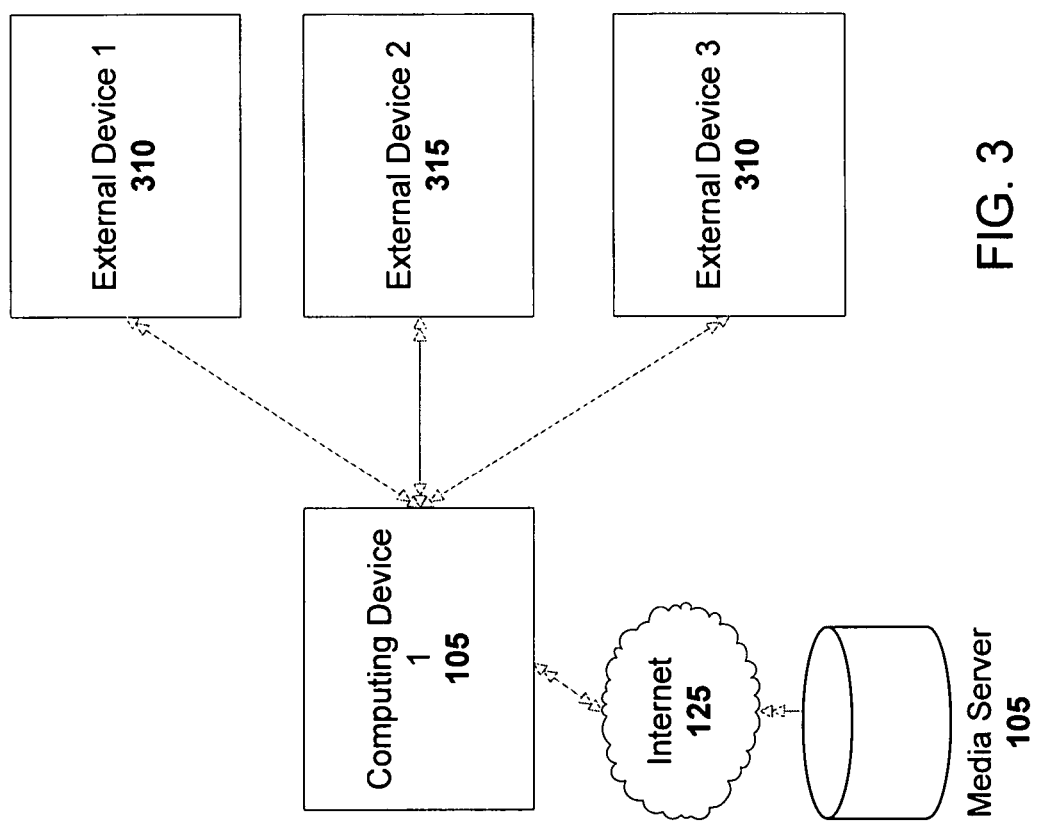
FIG. 3 is schematic illustrating an exemplary system architecture of one embodiment.

In one embodiment, the method and user interface for sharing a media collection among computing devices and/or network enabled devices in a network environment, allow each computing device and/or network enabled device to browse, access and/or playback any media file located with the network. Various combinations and variations of computing devices, network enabled devices, and the overall configurations of the network are contemplated. Some exemplary system architectures or configurations are depicted in FIGS. 1-3.

Figure 1:
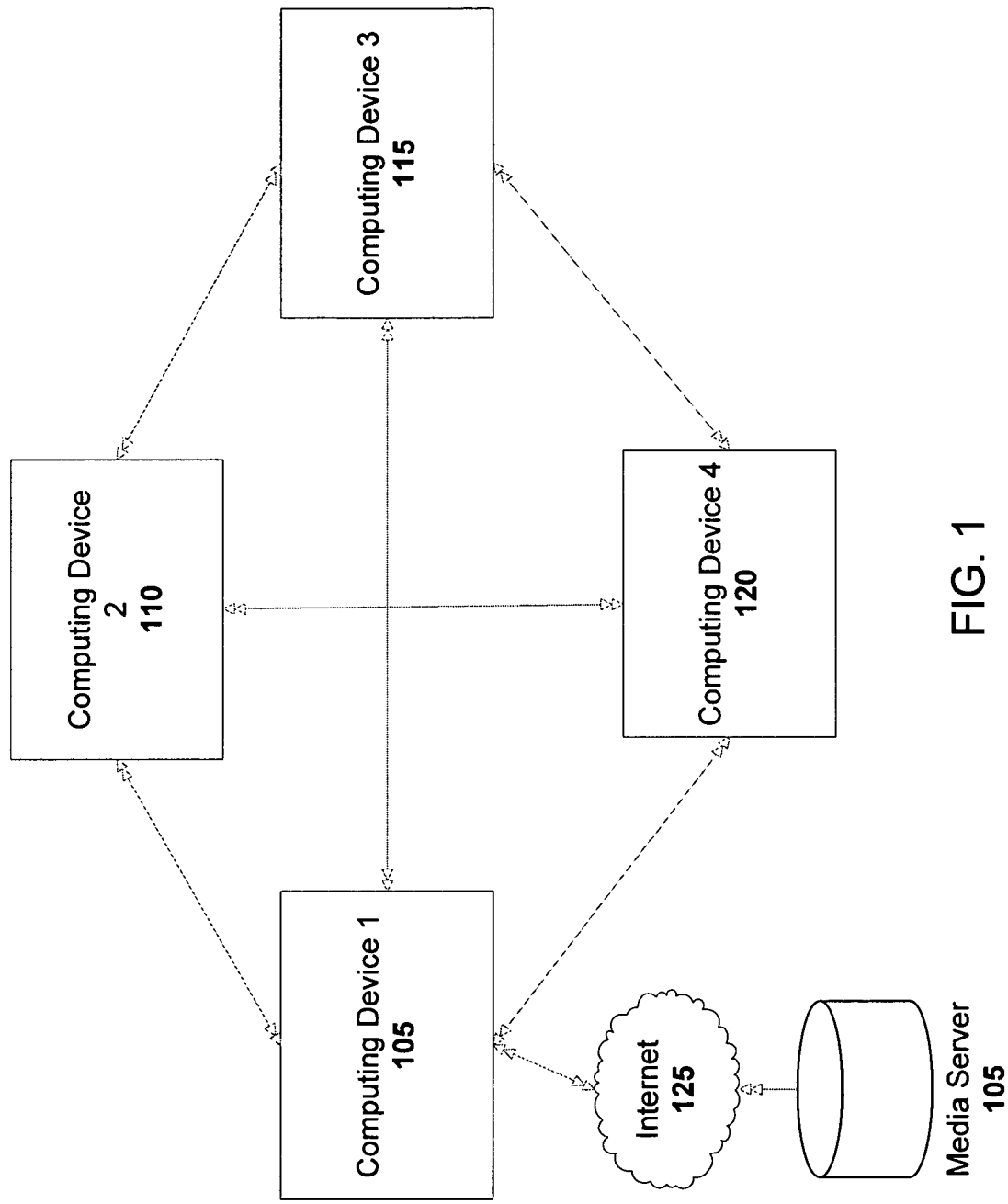
FIG. 1 is an exemplary system architecture of one embodiment.

In one embodiment, as depicted in FIG. 1, several computing devices 105, 110, 115, and 120 are a part of the network environment. Further, to create the network environment each computing device 105, 110, 115, and 120 is connected to each other. Thus, in one embodiment, as described in further detail herein, each computing device can access the media files associated with the any other computing device on the network. In one embodiment, some or all of the computing devices 105, 110, 115, and 120 may be connected to the internet 125. For example, in FIG. 1 only Computing Device 1 105 is directly connected to the internet and the other computing devices 110, 115, and 120 are connected to Computing Device 1 105. Thus, each computing device can communicate with each other. In another example, as depicted in FIG. 2, each computing device 105, 110, and 115 has a direct connection to the internet 125. Further, as depicted in FIG. 3, Computing Device 1 105 may be connected to the internet 125 and in turn connected to several network enabled devices 310, 315, and 310. Of course, many combinations and variations of connections among the computing devices and/or network enabled devices and the internet are contemplated.

In a further embodiment, as depicted in FIG. 1, the internet connection allows a computing device, such as Computing Device 1 105, to communicate and access media files from an online media service, depicted as a media server 130, such as Yahoo! Media Engine and/or Musicmatch. In one embodiment, such an online media service allows a computing device to access thousands of media files available to the user via a subscription basis. Thus, in one embodiment, each computing device and/or network enabled device is capable of sharing, accessing, browsing, or playing the subscription based media files in a network environment.

Figure 4:
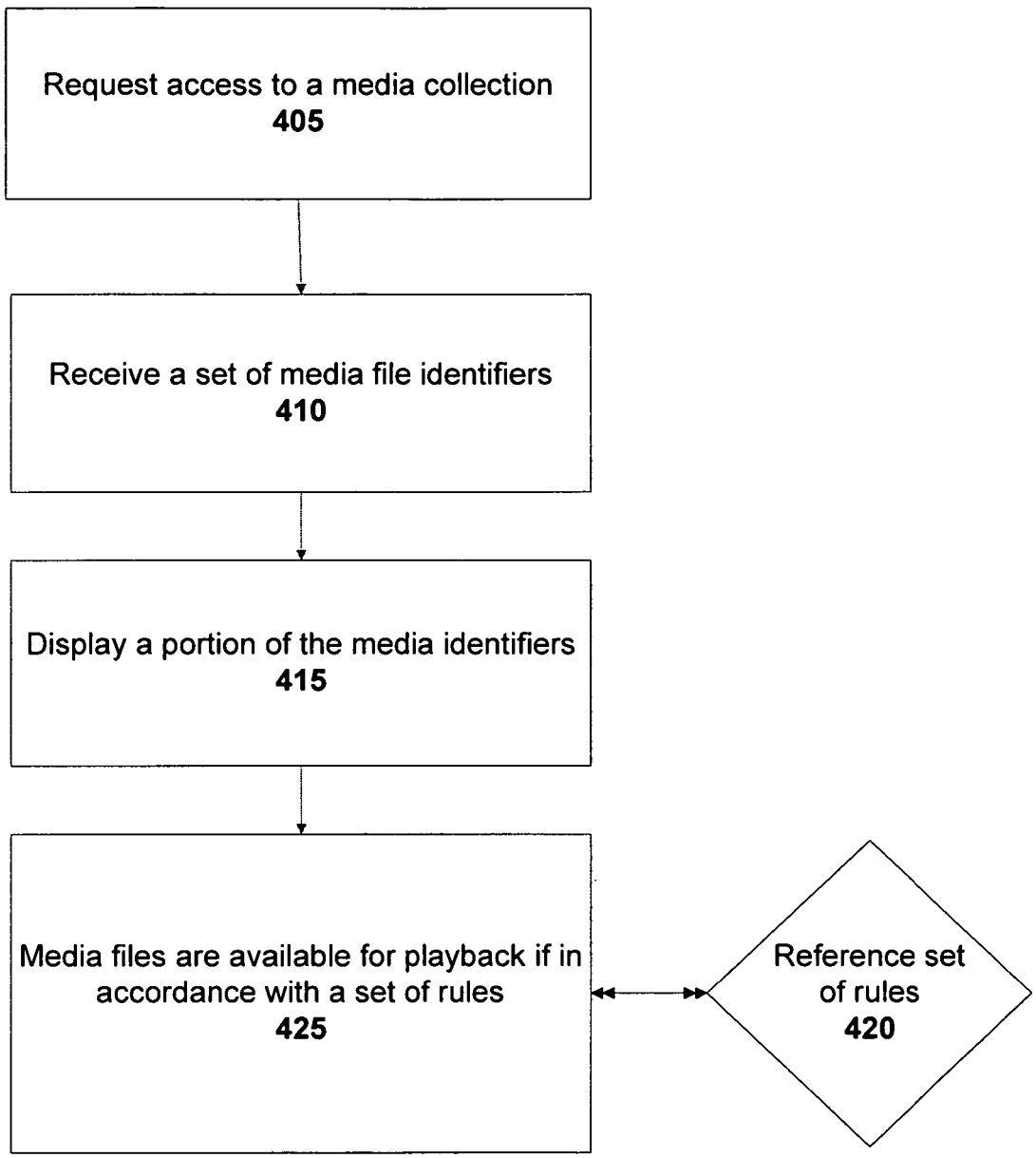
FIG. 4 is an exemplary flowchart according to one exemplary embodiment.

An exemplary method of sharing, accessing, browsing, and/or playing back a media file in a media file collection within a network environment is depicted in FIG. 4. As depicted in FIG. 4, first, one of the computing devices and/or network enabled devices on the network requests 405 access to a media collection on another computing devices and/or network enabled devices within the network.

In one embodiment, the request sequence 405 may comprise of multiple steps. In one embodiment, the requesting device, the computing device requesting the media collection, first identifies itself to the network. It is contemplated that any computing device is capable of being characterized as the requesting device. Other interested devices will then in turn identify themselves with the requesting device. At this point, the requesting device submits its device identity to the particular device it wishes to share from. The sharing device, the computing device which is associated with the media collection being requested by the requesting device, then verifies the device credentials and depending on the verification, allows the requesting device to proceed.

As depicted in FIG. 4, the requesting device requests and receives 410 a set of media file identifiers from the computing devices and/or network enabled devices. In one embodiment, the media file identifiers comprise pointers, urls, and/or uris associated with each media file in the requested media file collection and/or playlist. In another embodiment, the media file identifiers may also contain other information with respect to each media file such as whether the content is protected, the identity of the media file creator, the title, bit rate, duration, and/or size. In another embodiment, the requesting device can search for specific media that it is interested in. For example, it may request the first 5 tracks of unprotected audio belonging to the album Face in the Crowd, by artist Celeste. In another example, all audio files containing titles that starts with letter "A" belonging to the Genres Electronic and Dance. Then, based on the response some or the entire media file identifiers are displayed 415 at the requesting device. In a further embodiment, the requesting device receives any metadata associated with the request media file collection and/or playlist that is necessary to display the contents at the requesting device. For example, such metadata ay comprise the media files' title, artist, bit rate, duration, file size, album, genre, creation date, protection flag, mimtetype etc. It should be appreciated that there may be an indeterminate amount of metadata associated with a media file. Further, a requesting device can specify explicitly the type of metadata it is interested in when making the request. In one embodiment, at this point, the requesting device is capable of displaying and browsing through the computing devices/network enabled device's media collection and/or playlists. However, in one embodiment, as depicted in FIG. 4, in order for the requesting device to playback those media files, a set of rules must first be referenced 420.

In one embodiment, the set of rules is referenced in order to provide or deny authorization to the media files. An exemplary set of rules is depicted in FIG. 12 is described in further detail herein. In one embodiment, the media files are associated with an online media service. With reference to FIG. 4, after the set of rules have been reference 420, and authorization is successful, the requesting device can playback 425 some or all of the media files. In one embodiment, the authorization to request, view and play content is entirely at the choosing of the sharing device. For example, it may limit a device to only request five files. In another embodiment, it may choose to authorize devices that are only connected to the local network. Further, even as the device is playing, it may choose to deauthorize and prevent the requesting device from performing further actions. In one embodiment, all of these functions are based on rules created apriori for that content, or device or user or all of the above.

In one such embodiment, the set of rules applies to media files available from an online media service based on a subscription to the media service. In one embodiment, each subscription is associated with allowing access to particular media file formats by assigning that subscriber a particular permission, subscription, or authorization level. For example, media files from online media services are typically available as a streamed media file, as a purchasable, permanent download, and/or as a tethered download. Accordingly, a subscription could be associated a particular permission, subscription, or authorization level that allows that subscription to access all streaming media files and tethered downloads, but requires remittance in order to purchase a permanent download. In one embodiment, the level of access and the particular format of media files accessible may be dictated by price driven by DRM fees and pre-determined licensed fees. However, in one embodiment, sharing media files (of all formats) from an online media service available based on a subscriber's associate authorization level in a network environment requires that each computing device and/or network enabled device adhere to a set of rules. In one embodiment, these rules are applied when a computing device and/or network enabled device attempt to access or browse a media file collection of another computing device and/or network enabled device on the network. In another embodiment, these rules are applied when a computing device and/or network enabled device attempts to playback any media file in the media file collections of another computing device and/or network enabled device on the network.

In one embodiment, it is contemplated that the network only comprises computing devices. In another embodiment, the network may comprise a combination of computing device(s) and network enabled device(s). Further, each computing device has a particular subscription to an online media service and thus authorization level associated with it. Thus, in one embodiment, the level of access between these computing devices depends on their associated subscription level and the type of media files being accessed. FIG. 12 depicts an exemplary chart illustrating a set of rules. As can be seen in FIG. 12, the set of rules are based on an online media service subscription level associated with the requesting computing device and the sharing device and the media file format. Referring to FIG. 12, the requesting computing device comprises the computing device requesting access and/or playback of a media file from another computing device on the network. Further, the sharing computing device comprises the computing device from which the media file collection and/or playlist is being requested from.

As depicted in FIG. 12, in one embodiment, if the requesting computing device does not have any subscription to the online media service 1205, but the sharing computing device has a subscription 1210, then for the streaming media files associated with the sharing computing device's media collection, the requesting device can only play a portion of the media file 1215. For example, the requesting device could only play a 30 second clip of the media file. In another embodiment, the requesting device could be denied all access to the media file.

In another embodiment, if the requesting computing device does not have any subscription to the online media service 1205, but the sharing computing device has a subscription 1210, then for the tethered downloaded media files associated with the sharing computing device's media collection, the requesting device has full access provided that the sharing device has proper access 1220. However, in another embodiment, the requesting device must sign into the online media service under the sharing device's subscription id 1220. Then, the sharing device has full access to the tethered downloads.

In another embodiment, if the requesting computing device does not have any subscription to the online media service 1205, but the sharing computing device has a subscription 1210, then for the purchased downloaded media files associated with the sharing computing device's media collection, the requesting device has full access provided that the sharing device has proper access 1225. However, in another embodiment, the requesting device must sign into the online media service under the sharing device's subscription id 1225. Then, the sharing device has full access to the purchased downloads.

In yet another embodiment, if the requesting computing device does not have any subscription to the online media service 1205, but the sharing computing device has a subscription 1210, then for the non-DRM media files, media files with no associated licensing and purchasing rights, associated with the sharing computing device's media collection, the requesting device has full access to the non-DRM media files 1230.

In another embodiment, if both the requesting computing device and the sharing computing device are both associated with subscriptions 1235, 1240, then the requesting computing device may have full access 1245-1260 to every media file regardless of whether the file is a streamed file, a tethered download, a purchased download, and/or non-DRM.

In a further embodiment, the computing devices and/or network enabled devices within the network may be restricted to a set of rules not associated with a subscription to an online media service. For example, a set of rules may limit the number of devices that can share media files among each other. In another embodiment, this number may be based on the number of computing devices and does not account for network enabled devices. In another embodiment, a set of rules may only allow a computing device to stream media files to a certain number of network enabled devices. In another embodiment, a set of rules may require that all the computing devices and/or network enabled devices be located on the same subnet. Of course, many variations of rules, whether subscription based or not, known to those skilled in the art are contemplated.

In one embodiment, with reference to FIG. 1, in one example, the requesting device is Computing Device 1 105 and the sharing device is Computing Device 2 110. Of course, the requesting and sharing computing device may be any computing device within the network. Referring to FIG. 1, if the requesting device 105 is granted access to the media files associated with the sharing computing device's 110 media collection, the requesting computing device 105 can stream the media file directly from the sharing computing device 110. In another embodiment, the requesting device 105 can stream the media file directly from the media server 130. For example, the requesting media device can obtain an identifier, pointer, url, uri, or bookmark associated with the media file and use it to request the associated media file directly from the server.

In one embodiment, in which a network comprises a network enabled device, each network enabled device streams the media files, regardless of format or subscription, from the sharing media device. In another embodiment, if necessary, the computing device will request the media file from a media server and then stream it back to the requesting network enabled device.

Of course, these embodiments are not limited to streaming, tethered downloads, and/or purchased downloads, but can apply to any media files which require a specified level of sharing, viewing, and/or playing access. For example, it could be negotiated that certain media files generally not available for full-length sharing could be shared and played between any computing device and/or network enabled device of any status (subscribing or non-subscribing) for a pre-determined number of times.

In one embodiment, a user interface assists in the accessing, sharing, searching, and/or playback of a media collection in a network environment. In one embodiment, the user interface may be a part of a media management program. For example Yahoo! Music Engine or Musicmatch Jukebox. Accordingly, in one embodiment, the ability to share, search, and/or playback a media collection in a network environment is incorporated as a network application. In one embodiment, the network application may be characterized network feature or component of a media management program. An exemplary embodiment of user interfaces for sharing a media collection in a network environment is depicted in FIGS. 5-11.

Figure 5:
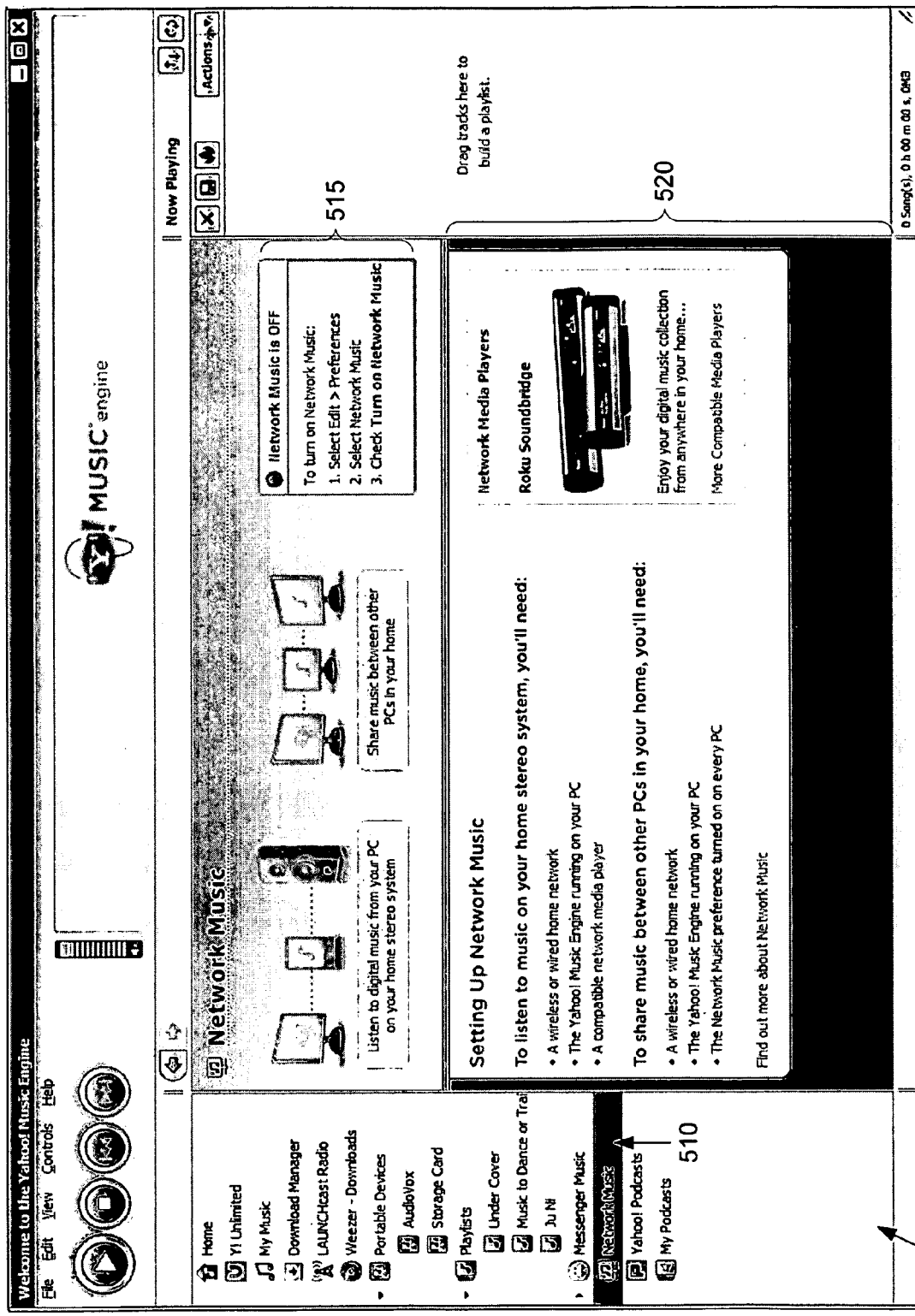
FIG. 5 is an exemplary user interface according to one exemplary embodiment.

FIG. 5 depicts an exemplary user interface of when the network is offline. As can be seen in FIG. 5, the user interface comprises a menu area 505 for browsing the features of a media management program including indicia 510 for selecting a network application for sharing, searching, and/or playback of a media collection in a network environment. Further, as can be seen in FIG. 5, the user interface comprises an area 515 for enabling the network application and selecting preferences and an area comprising instructions associated with configuring and managing the network feature.

Figure 11:
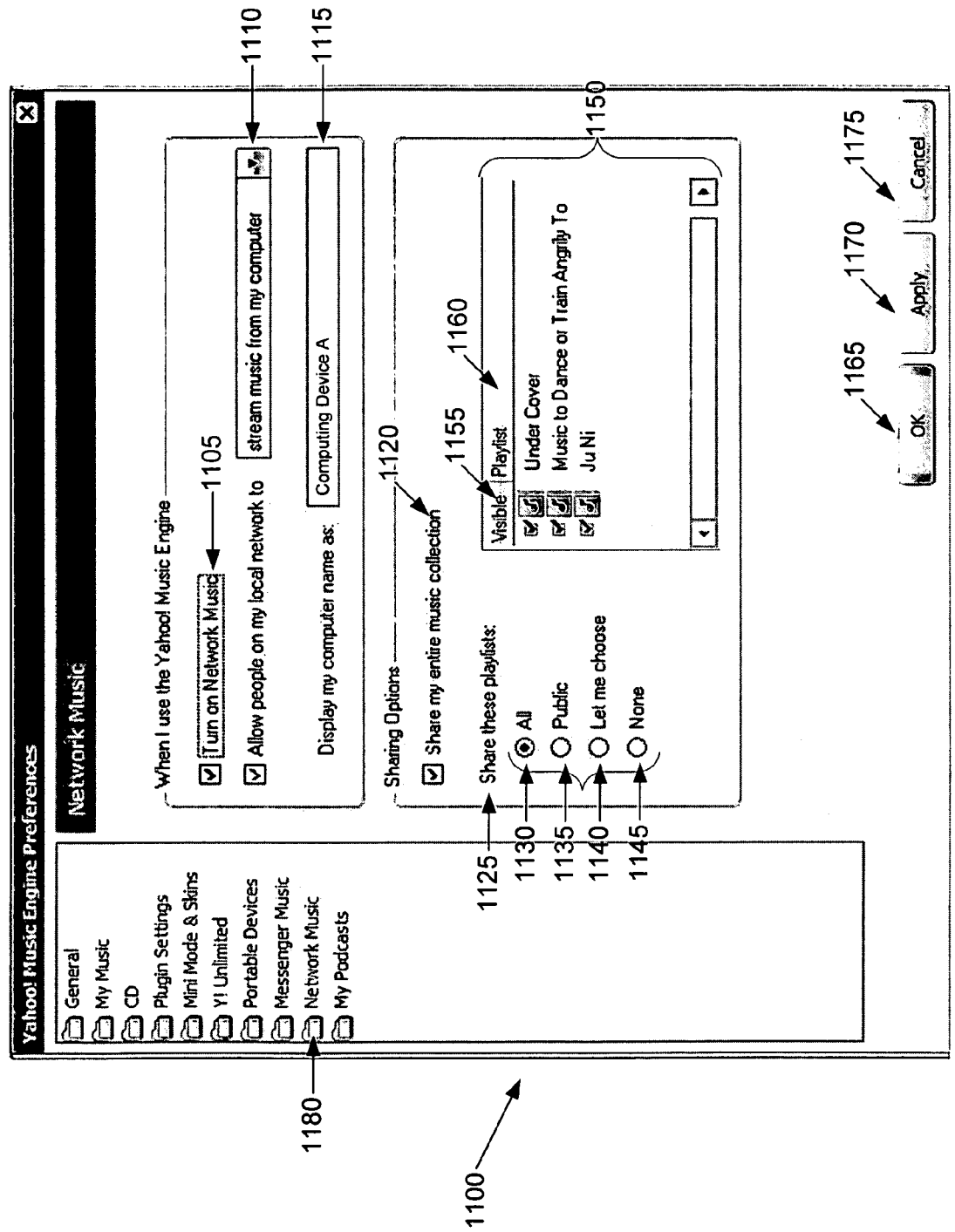
FIG. 11 is an exemplary user interface according to one exemplary embodiment.

In one embodiment, the network preferences enable a user to edit and configure features and settings associated with the network application. An exemplary user interface for setting the network application preferences is depicted in FIG. 11. As can be seen in FIG. 11, the preferences comprise settings that associated when a user turned on the media management application and settings associated with sharing options between computing devices and/or network enabled devices in network environment. For example, the settings associate one user turns on media management application comprise a field box for 1105 turning the network on and off the comment, of a field box and a drop down menu 1110 for allowing whether users to stream media files from a user's local computing device, to only allow others to view media from a users local computing device (not depicted) and the field box 1115 for entering the name of a local user's computing device. In a further embodiment, the network application sharing options comprise a field box 1120 first for enabling a user's entire media collection to be shared, an option 1125 of selecting particular playlist to be shared within the network environment such a sharing all playlists 1130, only those playlists designated as publicly available 1135, those playlists specifically chosen by a user 1140, and sharing no playlists 1145. Accordingly, area 1150 displays the playlist selected view the option 1125 of selecting particular playlist to be shared in the network environment. For example, selecting the sharing all option 1130 causes area 1150 to display all of a user's playlists that are available for sharing across the network environment. Further in one embodiment, area 1150 comprises a column 1160 for listing the playlist title and a column 1155 comprising the field box were user can manually select or deselect a playlist to be shared on the network. Further the user interfaces depicted in FIG. 11 comprises user input indicia such as buttons for enabling 1165 the selected preferences, applying 1170 the selected preferences, and canceling 1175 the selected preferences. Of course, it is contemplated that a user can select and/or edit the network application preferences at any time.

Figure 6:
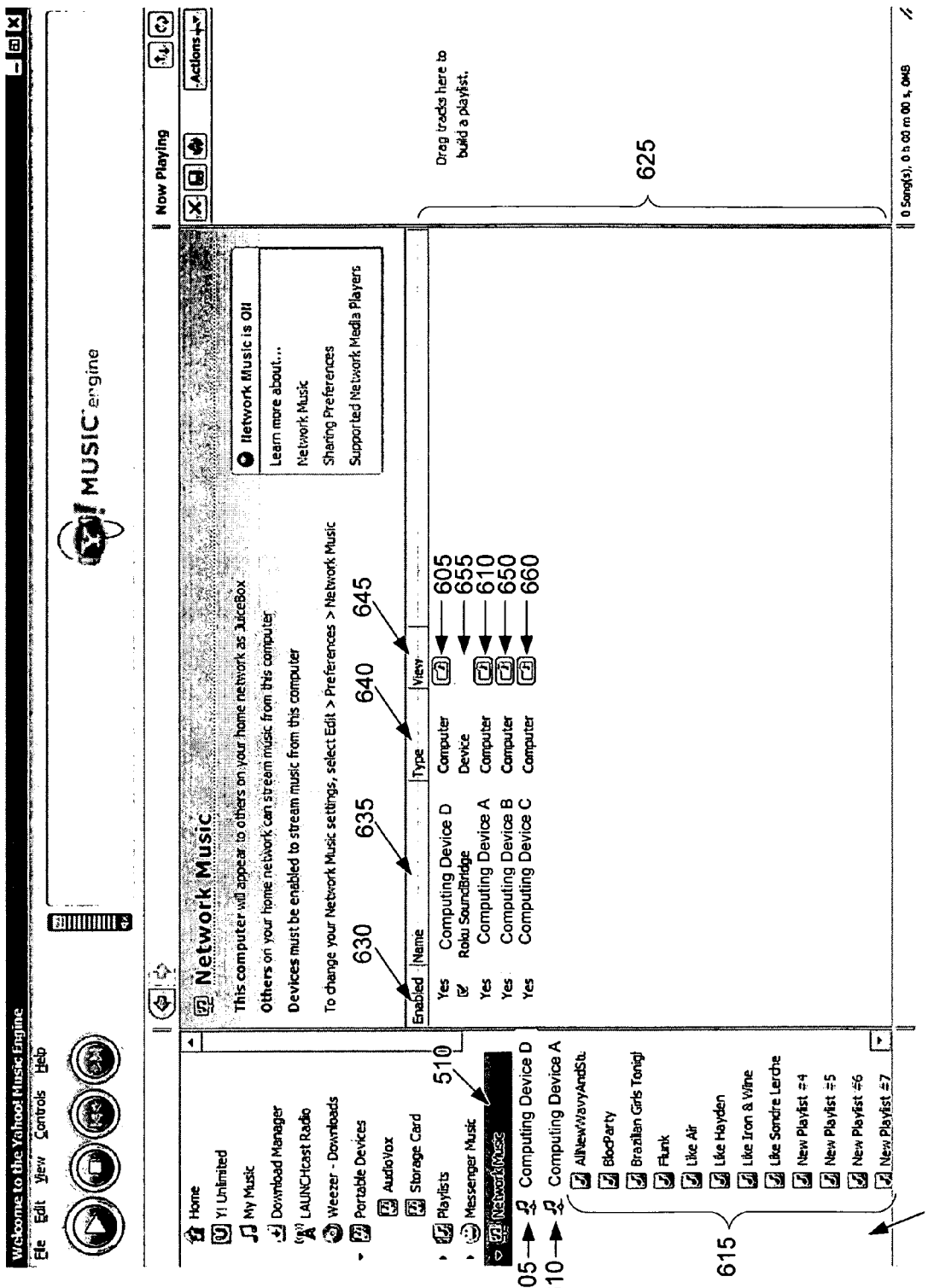
FIG. 6 is an exemplary user interface according to one exemplary embodiment.

In one embodiment, once the network application is enabled, the user interface displays all but computing devices and/or network at a network enabled devices available in the network in environment. FIG. 6 depicts an exemplary user interface of when the network is enabled or online. The user interface of FIG. 6 comprises the menu area 505 for browsing the features of a media management program. As can be seen in FIG. 6, the indicia 510 for selecting a network application for sharing, searching, and/or playback of a media collection in a network environment have been selected. Further, in one embodiment, upon selecting the network indicia 510, a menu listing each computing device 605, 610 and/or network enabled device available on the network appears. In one embodiment, as depicted in FIG. 6, upon highlighting or otherwise selecting a listed computing device 610, a list 615 of the playlists and/or a media collection associated with the listed computing device 610 appears. In other embodiments, the available artists, albums, media files, songs, or other associated media file category associated with the listed computing device may appear upon selecting a listed computing device and/or network enabled device. As depicted in FIG. 6, the user interface further comprises an area 625 listing identifiers associated with each of the computing devices and/or network enabled devices available on the network. As can be seen in FIG. 6, the network comprises four computing devices 605, 610, 650, 660 and a network enabled device 655. The computing device and/or network enabled device the user is currently located at may or may not be listed among the available device, however viewable from the user interface of the other devices. In a further embodiment, the area 625 is organized in columnar format such as a column 630 indicating whether the computing device or network enabled device is enabled, a column 635 listing the name associated with the computing device, network enabled, device and/or subscriber id, a column 640 indicating the type of device, a column 645 comprising a link for viewing the media collection associated with the computing device and/or network enabled device. For example, an enabled computing device 610 available in the network environment is associated with the name "Computing Device A." Further, a user can browse the media collection associated with "Computing Device A" 610. In one embodiment, the user can browse, playback, or otherwise access the media collection associated with "computing device a" by selecting the link 645. In another embodiment, the user can browse, playback, or otherwise access the media collection associated with "Computing Device A" by selecting the link 610 listed in the menu 505. In one embodiment, as described in further detail herein, the ability to playback a media file is determined according to a set of rules.

Figure 7:
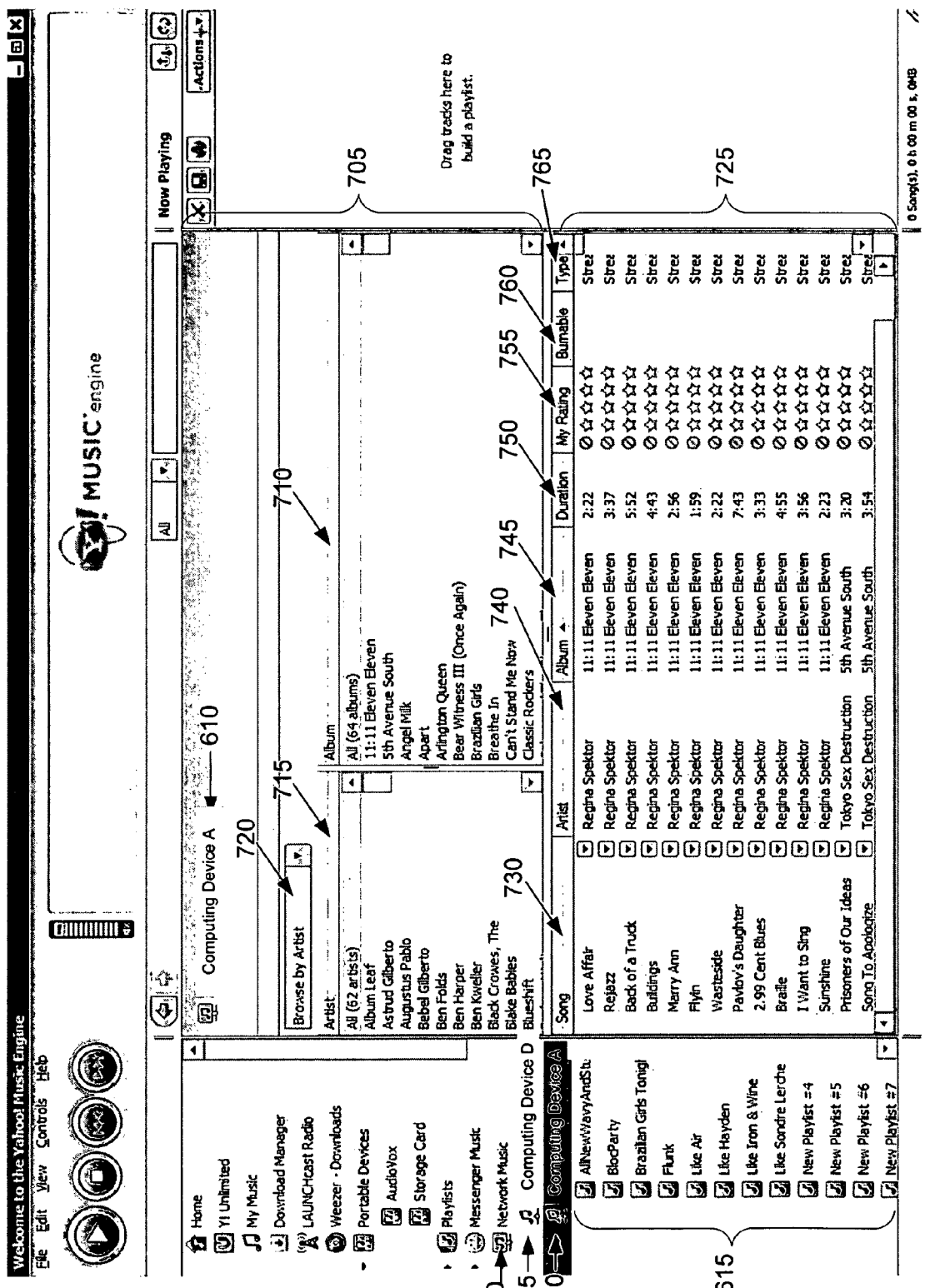
FIG. 7 is an exemplary user interface according to one exemplary embodiment.

In any event, in one embodiment, once a user selects a computing device and/or network enabled device to view the access the media collection, the user is able to browse the media collection by artist, genre, song/media file, album, and/or any other identifiable media file category. Thus, this allows for easy organization and access of a remote media collection. In one embodiment the user interface comprises the drop-down menu for selecting the category for browsing a media collection. FIG. 7 depicts an exemplary user interface of browsing Computing Device A's 610 media collection by artist. As can be seen in FIG. 7, "artist" has been selected from the drop-down menu 720. In one embodiment, area 715 displays all the artist of computing devices a media collection. In one embodiment as depicted in FIG. 7, area 715 is a scrollable area listing each artist alphabetically allowing a user to search by artist name. in one embodiment, selecting artist from area 715 causes all the media files this issue with that artist located in Computing Device A's media collection to be displayed in columnar format. For example as depicted in FIG. 7, all artists have been selected from areas 715. Accordingly, areas 725 displays all the artists located in computing devices media collection. Further, area 725 comprises several columns such as a columns 730 listing the media file title, a column 740 listing the artist associated with the media file, a column 745 listing the all name associated with the media from, column 750 listing the duration or length of the media file, column 755 listing a user or community applied rating associated with the media file, column 760 for displaying an icon indicating whether the media file is transferable to a portable device or medium, and/or column 765 for listing the type of media file and/or how the media file may be acquired from a computing device. Further in one embodiment as depicted in FIG. 7, the user interface comprises a scrollable area 710 listing all of computing devices media collection organized by album name. thus although the drop-down menu 720 allows the user to browse by artist, in one embodiment the user interface also allows the user to browse by album 710. Further, from this user interface, according to a set of rules as described in further detail here, each media file listed may be played by the user.

Figure 8:
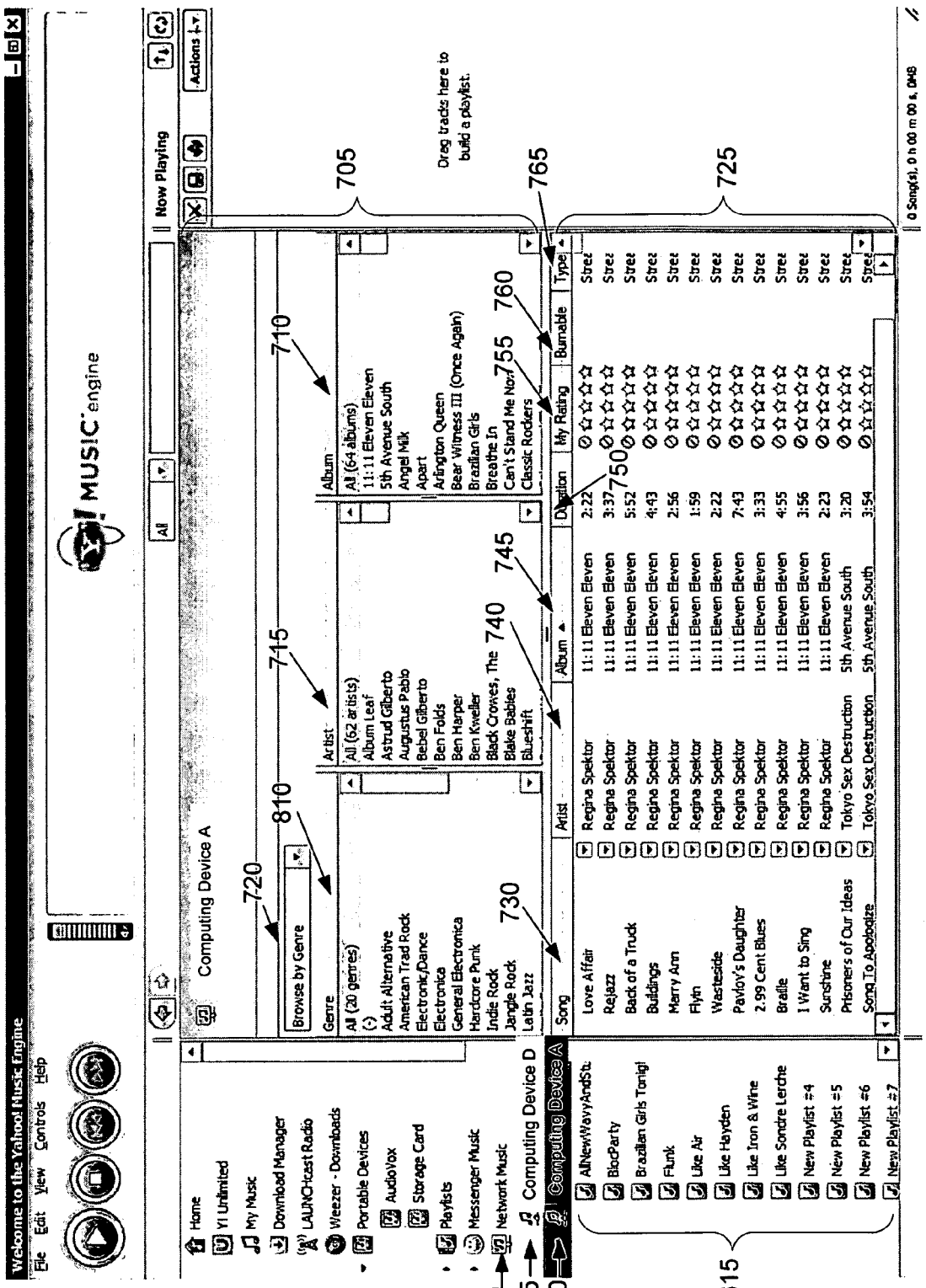
FIG. 8 is an exemplary user interface according to one exemplary embodiment.

FIG. 8 depicts an exemplary user interface of browsing a media collection in a network by genre. As can be seen in FIG. 8, "genre" has been selected from the drop-down menu 720.

In one embodiment, area 810 displays Computing Device A's media collection organized alphabetically by artist thus allowing a user to search by genre. In one embodiment, selecting genre from area 810 causes all the media files in Computing Device A's media collection to be displayed in columnar format. For example as depicted in FIG. 8, all genres have been selected from areas 810. Accordingly, areas 725 displays all the genres associated with Computing Device A's media collection. further area 725 comprises several columns such as a columns 730 listing the media file's associated title, a column 740 listing the artist associated with the media file, a column 745 listing the album associated with the media file, column 750 listing the duration or length of the media file, column 755 listing a user or community applied rating associated with the media file, column 760 for displaying an icon indicating whether the media file is transferable to a portable device or medium, and/or column 765 for listing the type of media file and/or how the media file may be acquired from Computing Device A. Further in one embodiment as depicted in FIG. 7, the user interface comprises a scrollable area 710 listing all of computing devices media collection organized by album name. Thus although the drop-down menu 720 allows the user to browse by genre, in one embodiment, the user interface also allows the user to browse by album 710 and artist 715. Similarly, from this user interface, according to a set of rules as described in further detail here, each media file listed may be played by the user.

Figure 10:
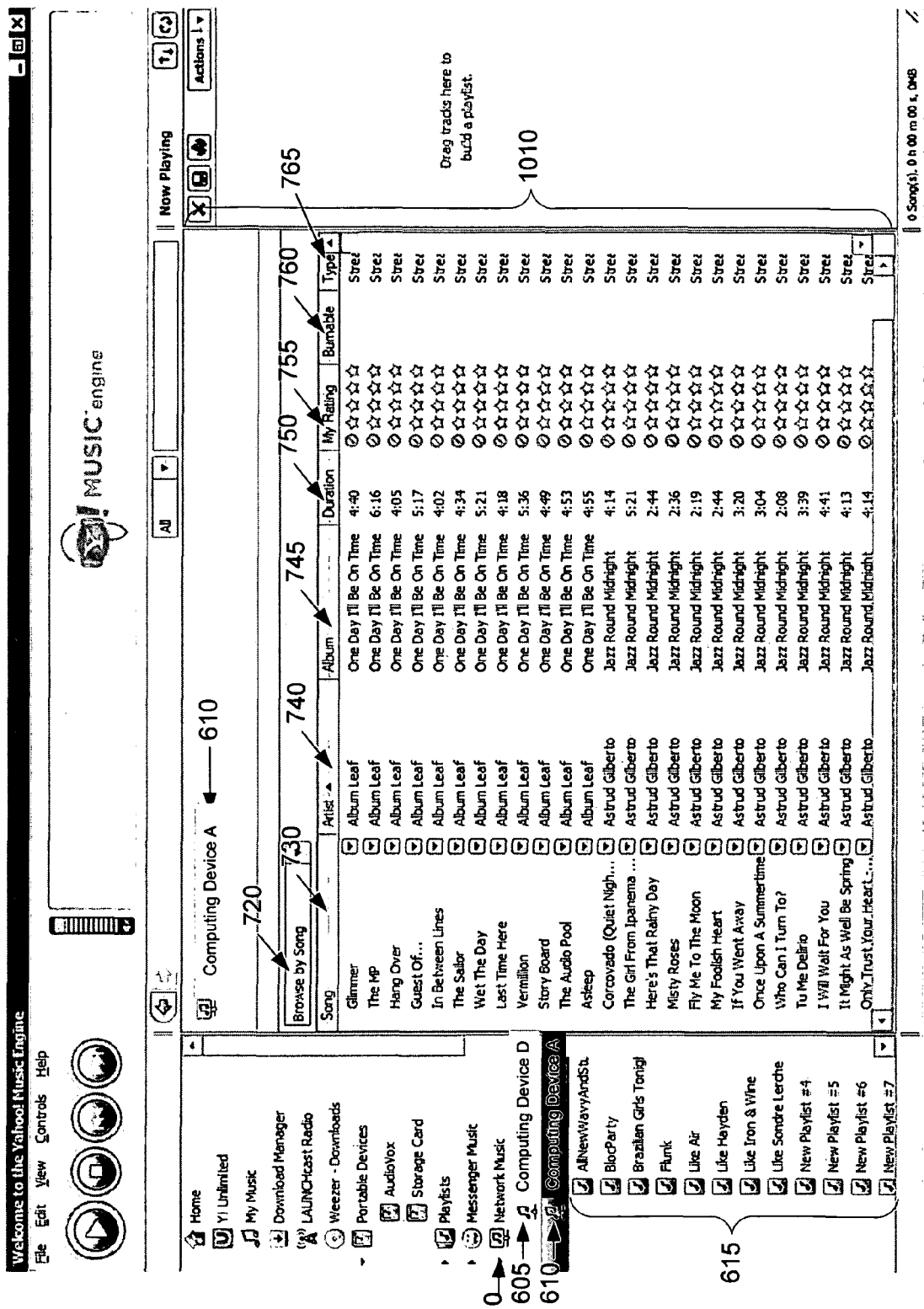
FIG. 10 is an exemplary user interface according to one exemplary embodiment.

FIG. 10 depicts an exemplary user interface of browsing a media collection in a network by song or media file title. As can be seen in FIG. 8, "song" has been selected from the drop-down menu 720. In one embodiment, selecting song or media file title from the drop down menu 720 causes all the media files in Computing Device A's media collection to be displayed via media file title in columnar format in an area 1010. For example as depicted in FIG. 10, area 1010 displays all the media file titles associated with Computing Device A's media collection. Further, area 1010 comprises several columns such as a columns 730 listing the media file's associated title, a column 740 listing the artist associated with the media file, a column 745 listing the album associated with the media file, column 750 listing the duration or length of the media file, column 755 listing a user or community applied rating associated with the media file, column 760 for displaying an icon indicating whether the media file is transferable to a portable device or medium, and/or column 765 for listing the type of media file and/or how the media file may be acquired from Computing Device A. Again, from this user interface, according to a set of rules as described in further detail here, each media file listed may be played by the user.

In another embodiment, a user can browse the playlists associated with a media collection available on the network. For example, as depicted in FIGS. 6-10, a menu 505 lists the network application 510 choice which expands to list some or all of the computing devices and/or network enabled device available in the network environment. For example, as depicted in FIG. 6, menu 505 lists computing device D 605 and Computing Device A 610 under the network application choice 510. Further, in one embodiment as depicted in FIG. 6, each computing device and/or network enabled device choice 605, 610 can be expanded to list all the playlists available on that particular computing device and/or network enabled device. For example, in FIG. 9, Computing Device A 610 has been expanded to show all of its available playlists 615. As discussed herein, through a preferences user interface, a user is able to configure which playlists are available to the other computing devices and/or network enabled devices on the network.

In another embodiment as illustrated in FIG. 6, the sharing device may choose to discover and display all other devices on its network or some subset of them based on some preference criteria. For example, the sharing device may choose to only display to other devices that can play DRM protected Windows Media content. In one embodiment, it is not necessary for a device to make a request to be visible to the sharing device. In another embodiment, the sharing device may choose to automatically have any device that it can discover to perform some specific action, if the target devices allows this. For example, with reference to FIG. 6, the sharing device may choose to have Device A 610 play an audio track while Device B 650 is playing a slideshow. Or alternately, the sharing device may choose to pause Device A 610 while it is performing some action like play.

Figure 9:
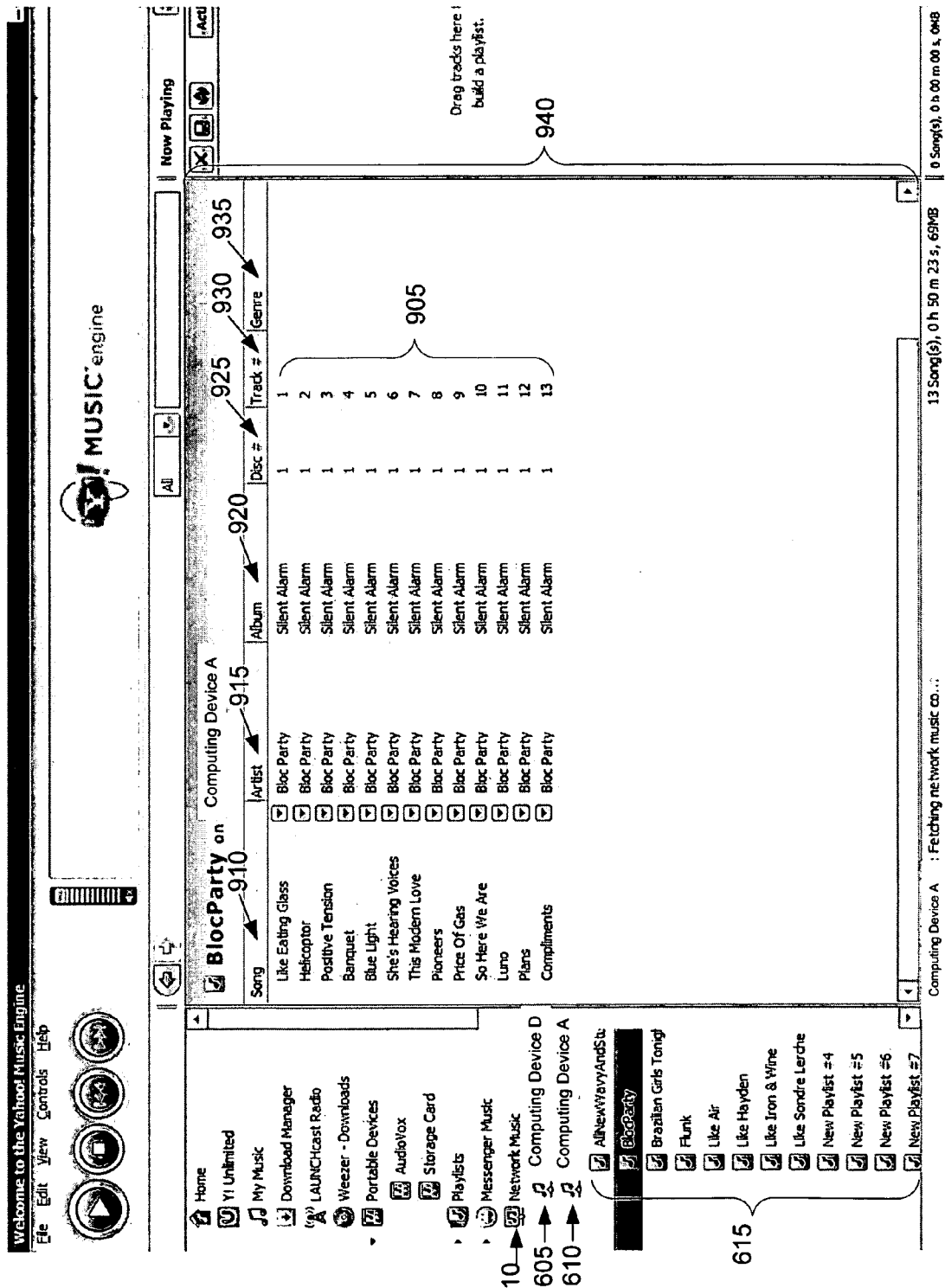
FIG. 9 is an exemplary user interface according to one exemplary embodiment.

In one embodiment, as depicted in FIG. 9, a user can access and/or play any playlist listed in the menu 505 by selecting and/or highlighting the playlist choice 905. As depicted in FIG. 9, selecting the "Bloc Party" playlist 905 from the menu 505 causes the media files in the playlist 905 to be displayed in an area 940. In one embodiment, the media files in the playlist are displayed in columnar format comprising columns listing information associated with each media file. For example, column 910 lists the media file title, column 915 lists the artist associated with the media file, column 920 lists the album name associate with the media, column 920 lists the disc number associated with the media file, column 925 lists the track number associated with the media file, and column 935 lists the genre associated with the media file. Of course from this user interface, according to a set of rules as described in further detail here, each media file listed may be played by the user by selecting or highlighting the desired media file.

Those skilled in the art will recognize that the method and system of the present invention within the application may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art.

We claim:

1. A method comprising:

requesting, from a first computing device operated by a first subscriber, access to a media collection associated with a second subscriber on a second computing device, the first and second computing device to communicate via a network, said first subscriber associated with a first level of authorization to interact with an online media service and said second subscriber associated with a second level of authorization to interact with said online media service, said first level of authorization and said second level of authorization individually specifying one or more formats of one or more media files of said media collection authorized to be accessed by the first subscriber and/or the second subscriber, said formats comprising one or more of streaming, tethered download, purchased, non-digital rights management (DRM), and DRM formats;

receiving, at said first computing device, a set of media file identifiers from said second computing device, wherein said set of media file identifiers is associated with a respective set of media files of said media collection;

displaying at least a portion of said set of media file identifiers; and requesting a media file of said set of media files identified by an identifier of the set of media identifiers to be transmitted from a source to said first computing device to be played on said first computing device at least in part in response to said first level of authorization and said second level of authorization being associated with a subscription to said online media service.

2. The method of claim 1, further comprising analyzing a user's level of authorization to interact with said online media service.

3. The method of claim 2, wherein said set of media files are available for being experienced on said first computing device at least in part in response to said first level of authorization matching a predetermined level of authorization.

4. The method of claim 2, wherein said set of media files are prevented from being experienced on said first computing device at least in part in response to said first level of authorization not matching a predetermined level of authorization.

5. The method of claim 1, wherein said first level of authorization and said second level of authorization comprise an identical level of authorization.

6. The method of claim 2, wherein said set of media files are available for being experienced on said first computing device at least in part in response to said first level of authorization matching said second level of authorization.

7. The method of claim 2, wherein said set of media files are prevented from being experienced on said first computing device at least in part in response to said first level of authorization not matching said second level of authorization.

8. The method of claim 1, wherein one or more of said first level of authorization and said second level of authorization specify full access to all media files of said online media service.

9. The method of claim 1, wherein one or more of said first level of authorization and said second level of authorization specify full access to all tethered media file downloads of said online media service.

10. The method of claim 1, wherein one or more of said first level of authorization and said second level of authorization specify full access to all streaming media files of said online media service.

11. The method of claim 1, wherein one or more of said first level of authorization and said second level of authorization specify preventing access to all media files of said online media service.

12. The method of claim 1, wherein one or more of said first level of authorization and said second level of authorization specify allowing access to a portion of said media collection of said online media service.

13. The method of claim 1, further comprising preventing said media files from being streamed to said first computing device at least in part in response to said second level of authorization specifying a subscription to said online media service and at least in part in response to said first level of authorization not specifying said subscription to said online media service.

14. The method of claim 1, further comprising preventing said media files from being downloaded to said first computing device at least in part in response to said second level of authorization specifying a subscription to said online media service and at least in part in response to said first level of authorization not specifying said subscription to said online media service.

15. The method of claim 1, wherein said network comprises the internet.

16. The method of claim 1, wherein said network comprises a local area network.

17. The method of claim 1, wherein said network is constrained to computing devices connected to said network.

18. The method of claim 1, wherein said set of media file identifiers comprises one or more pointers to one or more media files of said respective set of media files.

19. The method of claim 1, wherein said set of media file identifiers comprises one or more uniform resource locators.

20. The method of claim 1, wherein said set of media file identifiers comprises one or more universal resource identifiers.

21. The method of claim 1, wherein said source comprises a server.

22. The method of claim 1, wherein said source comprises said second computing device.

23. The method of claim 1, wherein said source comprises a plurality of computing devices.

24. The method of claim 1, wherein one or more of said first computing device and said second computing device comprises a personal computer.

25. The method of claim 1, wherein said media collection comprises a plurality of media files.

26. The method of claim 25, wherein said media file comprises one or more audio files.

27. The method of claim 25, wherein said media file comprises one or more video files.

28. The method of claim 1, wherein said media collection comprises a playlist.

29. The method of claim 1, further comprising receiving, from said second subscriber, a setting associated with sharing said media collection.

30. The method of claim 29, wherein said setting comprises user-entered text representing a name of said second computing device as it appears to said first computing device.

31. The method of claim 29, wherein said setting comprises permitting said second computing device to stream media files to said first computing device.

32. The method of claim 29, wherein said setting comprises a value specifying permitting said first computing device to browse media files associated with said second computing device.

33. The method of claim 1, further comprising receiving, from said second subscriber, a preference associated with sharing said media collection.

34. The method of claim 33, wherein said preference comprises a value specifying permitting said media collection to be shared with said first computing device.

35. The method of claim 33, wherein said preference comprises a value specifying permitting a portion of said media collection to be shared with said first computing device.

36. The method of claim 33, wherein said preference comprises a value specifying permitting playlists associated with said second subscriber to be shared with said first computing device.

37. The method of claim 36, wherein said preference comprises a value specifying permitting playlists designated as public by said second subscriber to be shared with said first computing device.

38. The method of claim 33, wherein said preference comprises a value specifying permitting user-selected playlists associated with said second subscriber to be shared with said first computing device.

39. The method of claim 33, wherein said preference comprises a value specifying preventing playlists associated with said second subscriber to be shared with said first computing device.

40. The method of claim 1, wherein said source comprises a first source at least in part in response to said set of media files being acquired by streaming and wherein said source comprises a second source at least in part in response to said set of media files being downloaded as a tethered download.

41. An apparatus, comprising:
   means for requesting, from a first computing device operated by a first subscriber, access to a media collection associated with a second subscriber on a second computing device, the first and second computing device to communicate via a network, said first subscriber associated with a first level of authorization to interact with an online media service and said second subscriber associated with a second level of authorization to interact with said online media service, said first level of authorization and said second level of authorization individually specifying one or more formats of one or more media files of said media collection authorized to be accessed by the first subscriber and/or the second subscriber, said formats comprising one or more of streaming, tethered download, purchased, non-digital rights management (DRM), and DRM formats;
   means for receiving, at said first computing device, a set of media file identifiers from said second computing device, wherein said set of media file identifiers is associated with a respective set of media files of said media collection;
   means for displaying at least a portion of said set of media file identifiers; and
   means for requesting a media file of said set of media files identified by an identifier of the set of media identifiers to be transmitted from a source to said first computing device to be played on said first computing device at least in part in response to said first level of authorization and said second level of authorization being associated with a subscription to said online media service.

42. An article, comprising: a non-transitory storage medium having stored thereon instructions executable by a processor of a first computing device to:
   request, from the first computing device operated by a first subscriber, access to a media collection associated with a second subscriber on a second computing device, the first and second computing devices to communicate via a network, said first subscriber associated with a first level of authorization to interact with an online media service and said second subscriber associated with a second level of authorization to interact with said online media service, said first level of authorization and said second level of authorization individually specifying one or more formats of one or more media files of said media collection authorized to be accessed by the first subscriber and/or the second subscriber, said formats comprising one or more of streaming, tethered download, purchased, non-digital rights management (DRM), and DRM formats;
   receive a set of media file identifiers from said second computing device, wherein said set of media file identifiers is associated with a respective set of media files of said media collection;
   initiate display of at least a portion of said set of media file identifiers; and
   request a media file of said set of media files identified by an identifier of the set of media identifiers to be transmitted from a source to said first computing device to be played on said first computing device at least in part in response to said first level of authorization and said second level of authorization being associated with a subscription to said online media service.

\* \* \* \* \*